US012625354B2

(12) United States Patent　　　　(10) Patent No.:　US 12,625,354 B2
Hollinger et al.　　　　　　　　　　(45) Date of Patent:　　　May 12, 2026

(54) LIGHT SHEET MICROSCOPE

(71) Applicant: Carl Zeiss Microscopy GmbH, Jena (DE)

(72) Inventors: Richard Hollinger, Jena (DE); Jörg Siebenmorgen, Jena (DE); Helmut Lippert, Jena (DE); Ralf Wolleschensky, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 376 days.

(21) Appl. No.: 18/477,300

(22) Filed: Sep. 28, 2023

(65) Prior Publication Data

US 2024/0111141 A1　　Apr. 4, 2024

(30) Foreign Application Priority Data

Sep. 29, 2022　(DE) ..................... 10 2022 125 117.9

(51) Int. Cl.
　G02B 21/00　　　(2006.01)
　G02B 21/36　　　(2006.01)
(52) U.S. Cl.
　CPC ..... G02B 21/0032 (2013.01); G02B 21/0036 (2013.01); G02B 21/367 (2013.01)
(58) Field of Classification Search
　CPC ............ G02B 21/0032; G02B 21/0036; G02B 21/367; G02B 21/0076
　See application file for complete search history.

(56) References Cited

U.S. PATENT DOCUMENTS

| | | | |
|---|---|---|---|
| 2017/0068080 A1 | 3/2017 | Anhut et al. | |
| 2021/0341718 A1* | 11/2021 | Fahrbach | ........... G02B 21/0076 |
| 2022/0043246 A1 | 2/2022 | Anhut et al. | |

FOREIGN PATENT DOCUMENTS

| | | |
|---|---|---|
| DE | 102 57 423 A1 | 6/2004 |
| DE | 10 2014 102 215 A1 | 8/2015 |
| DE | 10 2015 209 756 A1 | 12/2016 |
| DE | 10 2020 209 889 A1 | 2/2022 |
| EP | 0 866 993 B1 | 2/2004 |

(Continued)

OTHER PUBLICATIONS

Huisken, Jan, et al., "Selective plane illumination microscopy techniques in developmental biology," *Development*, vol. 136, pp. 1963-1975 (2009).

*Primary Examiner* — Charles S Chang
(74) *Attorney, Agent, or Firm* — Christensen, Fonder, Dardi & Herbert PLLC; John P. Fonder

(57)　　　　　　ABSTRACT

A light sheet microscope for illuminating a sample arranged in an object plane on a sample carrier, comprising: an illumination device having an objective for illuminating the sample via an illumination beam path with a first light sheet, which intersects the sample volume in a first light sheet plane, the first light sheet plane intersecting the object plane at a skew first illumination angle ($\alpha$), and a detection device for imaging of light coming from the sample, having an objective, the focal plane lying in the sample volume parallel to or in the object plane, and an area detector having a detector plane. The area detector includes a first slit stop in the detection beam path upstream of the area detector so as to mask out such regions of the sample volume which are illuminated by the first light sheet but lie outside the focal plane of the detection objective.

20 Claims, 5 Drawing Sheets

(56)         References Cited

FOREIGN PATENT DOCUMENTS

| | | | |
|---|---|---|---|
| EP | 2 681 533 | B1 | 8/2017 |
| WO | WO 2004/052558 | A1 | 6/2004 |
| WO | WO 2012/110488 | A2 | 8/2012 |
| WO | WO 2012/122027 | A2 | 9/2012 |
| WO | WO 2018/089839 | A1 | 5/2018 |
| WO | WO 2021/097300 | A1 | 5/2021 |
| WO | WO 2004/053558 | A1 | 6/2024 |

* cited by examiner

LIGHT SHEET MICROSCOPE

PRIORITY CLAIM

The present application claims priority to German Patent Application No. 10 2022 125 117.9, filed on Sep. 29, 2022, which said application is incorporated by reference in its entirety herein.

FIELD OF THE INVENTION

The invention relates to a light sheet microscope for illuminating a sample having a sample volume, said sample being arranged in an object plane on a sample carrier. The sample carrier can be embodied for example as a multiwell plate, a Petri dish, an object carrier or as any desired sample carrier that is commonplace in the prior art for light sheet microscopy. The sample volume can be a volume of one sample, or a plurality of samples can be arranged in the sample volume. The light sheet microscope comprises an illumination device having an illumination objective for illuminating the sample via an illumination beam path with a first light sheet, which intersects the sample volume in a first light sheet plane. The first light sheet plane intersects the object plane at a skew first illumination angle. Skew is any angle which is greater than 0° and less than 90°. The light sheet microscope furthermore comprises a detection device for the imaging of light coming from the sample, having a detection objective, the focal plane of which lies in the sample volume parallel to or in the object plane, and an area detector having a detector plane. In this case, the focal plane is understood to mean that region which is extended along the optical axis of the detection objective and which is imaged sharply with inclusion of the depth of focus of the detection objective. The light coming from the sample is preferably fluorescence light excited in the sample by the illumination with the first light sheet, the wavelengths or wavelength ranges of said fluorescence light being different than a first wavelength of excitation light used for generating the first light sheet. The invention furthermore relates to a method for light sheet microscopy.

BACKGROUND OF THE INVENTION

In light sheet microscopy, a thin layer, typically a few micrometers of a sample marked with fluorescence markers, is illuminated by means of a light sheet generated by an illumination device. As a result, the sample is excited in the layer and fluorescence light is emitted from the layer. The fluorescence light can be imaged by a detection device, whereby a fluorescence image representation of the layer is captured on a detector. If a plurality of layers of a sample are recorded sequentially, even relatively large sample volumes can be imaged.

Light sheet microscopy is used in particular when examining biological samples. It is usually the case here that the light sheet which intersects the sample volume in a light sheet plane is oriented parallel to the object plane or forms an illumination angle with the object plane which is different than zero. Using this technique, which is also referred to as SPIM (Selective Plane Illumination Microscopy), spatial recordings even of relatively thick samples can be produced within a relatively short time. A visual, spatially extended representation of the sample is possible on the basis of optical sections combined with a relative movement in a direction perpendicular to a light sheet plane.

The SPIM technique is preferably used in fluorescence microscopy; in that context it is also referred to as LSFM (Light Sheet Fluorescence Microscopy). In that case, the sample is illuminated uniformly in a lateral direction. A selective imaging, i.e. an imaging associated with a small depth of focus, is then possible in the direction perpendicular to the light sheet plane. The LSFM technique has a number of advantages over other established methods such as confocal laser scanning microscopy or two-photon microscopy. Since the detection can be undertaken in the wide field, it is possible to capture relatively large sample regions. Even though the resolution is somewhat lower than in confocal laser scanning microscopy, it is possible to analyze thicker samples using the LSFM technique because the penetration depth is greater. Moreover, this method has the lowest light exposure of the samples, which inter alia reduces the risk of bleaching of the sample since the sample is only illuminated by a thin light sheet at a non-zero angle with respect to the detection direction.

The SPIM technique is now widely described in the literature, for example in DE 102 57 423 A1 and in WO 2004/053558 A1 based thereon, or in the review article "Selective Plane Illumination Microscopy Techniques in Developmental Biology" by J. Huisken et al., published in 2009 in the journal Development, vol. 336, page 63.

One of the main applications of light sheet microscopy is in the imaging of medium-sized organisms having a size of a few 100 μm up to a few millimeters. Said organisms are generally embedded in an agarose gel, which is in turn situated in a glass capillary. This glass capillary is introduced into a water-filled sample chamber and the sample is then forced out of the capillary a little way. The sample in agarose is subsequently illuminated with a light sheet and the fluorescence is imaged onto a camera using a detection objective which is perpendicular to the light sheet.

However, this procedure has some disadvantages. Firstly, the samples to be examined are relatively large; they originate from developmental biology. Their preparation in special cylindrical tubes filled with agarose gel is laborious and disrupts the normal laboratory procedures. It is not compatible with standard sample preparations and standard sample mounts. The unavoidable difference in refractive index between the cylindrical tube composed of glass or plastic and the agarose gel additionally results in optical aberrations which may adversely affect the resolution capability. Moreover, on account of the sample preparation and the dimensions of the sample chamber, the light sheet is relatively thick and the axial resolution that can be achieved is thus limited.

In order to be able to avoid these limitations at least in part, in recent years an SPIM set-up has been realized in which the illumination objective and the detection objective are perpendicular to one another and directed onto the sample from above at an angle of 45° in each case. If the plane of a table on which the sample vessel is mounted, or some other, usually horizontal plane, such as that of a coverslip or of the base of the sample vessel, is used as a reference surface, for example, then an illumination angle and a detection angle are 45° in each case. Such a set-up is described for example in WO 2012/110488 A1 and WO 2012/122027 A1.

In order to be able to use typical sample holders such as, for example, multiwell plates, Petri dishes and object carriers, the SPIM set-up can be embodied in an inverse configuration. In this case, the 45° configuration is maintained, the sample is illuminated from below through the transparent base of the sample mount and the fluorescence emitted by the sample is detected. This technique has been described under the designation SCAPE inter alia by V. Voleti et al. in "Real-time volumetric microscopy of in-vivo dynamics and large-scale samples with SCAPE 2.0", published in 2008 in the journal Nature Methods, volume 16, pages 20306-20316. In a further development, an oblique light sheet is generated by an elliptic Gaussian profile being generated in the pupil of the illumination objective. An aberration-free imaging of a sample volume is not possible owing to the aberrations which are induced by the sample and the detection optical units.

Illumination objective and detection objective are often configured as two different objectives. However, they can also be configured as a so-called double objective, as is described for example in EP 0 866 993 B1. Illumination objective and detection objective are then combined in a common structural unit; the respective optical units—i.e. the objectives with associated beam paths and optical elements arranged therein—then share some elements. Illumination beam path and detection beam path are then guided through one and the same structural unit or the double objective.

A light sheet microscope having an illumination device configured for generating a first light sheet and also at least one further light sheet arranged parallel to the first light sheet, for illuminating a further strip of the sample and for exciting fluorescence radiation in this further strip of the sample is known from DE 10 2015 209 756 A1.

The scientific article by C. Dunsby "Optically sectioned imaging by oblique plane microscopy", published in 2019 in the journal Optics Express, vol. 16, pages 1054-1062, describes that a one-to-one relay imaging with adapted magnification and subsequent magnification of the oblique intermediate image is used to correct the aberrations which are induced by the sample and the detection optical units.

The correction of the aberrations and attaining a high lateral resolution constitute the greatest difficulties in the imaging of the depth information perpendicular to an object plane using a light sheet microscope. In order to carry out a volume imaging in the light sheet microscope in an inverse configuration with only one double objective without any aberrations, a complex one-to-one relay imaging with adapted magnification and a subsequent magnified imaging of the intermediate image is necessary. Besides the increased complexity, especially in the imaging system proposed in the abovementioned scientific article by C. Dunsby, only part of the numerical aperture (NA) of the objective can be used effectively, which has a disadvantageous effect on the achievable lateral resolution of the microscope.

Moreover, photons which originate outside the region excited by the light sheet and outside the image plane are detected as a result of sample-induced light scattering. This has the consequence of impairing the image quality and the lateral resolution.

SUMMARY OF THE INVENTION

Therefore, an object of the invention is to provide a light sheet microscope which enables a large sample volume of one sample or of a plurality of samples to be imaged rapidly and with a very high resolution and also a very good contrast. Furthermore, the object of the invention is to provide a corresponding method for light sheet microscopy.

The object is achieved by means of a light sheet microscope of the type described in the introduction. The area detector comprises a first slit stop. The area detector can be designed as a CMOS chip, a PAD detector, a SPAD detector, or a CCD. The first slit stop can be a rolling shutter of the area detector. Whereas in a global shutter the entire image area is exposed simultaneously, in a rolling shutter individual lines of the area detector are exposed in a manner staggered over time. The first slit stop can alternatively be designed as a mechanically displaceable slit stop. It can be mounted directly on the area detector or be part of the area detector. The first slit stop is arranged in the detection beam path upstream of the area detector in such a way as to mask out such regions of the sample volume which are illuminated by the first light sheet but lie outside the focal plane of the detection objective. Regions of the sample volume which are illuminated by the first light sheet and lie in the focal plane are imaged on the area detector through an opening in the first slit stop. As a result, stray light and light coming from the sample from regions which lie outside the focal plane reach the area detector to a lesser extent, and an imaging contrast and also a lateral resolution are improved by comparison with a light sheet microscope without slit stops.

Advantageously, the first slit stop is arranged in the detection beam path in a displaceable fashion parallel to the detector plane in order to detect different regions of the focal plane. The detection device then comprises an adaptive optical detection element, which is arranged in the detection beam path or is introducible into the latter and is controlled by a control device and by which the focal plane of the detection objective can be displaced in the sample volume. The adaptive optical element can additionally be designed for correcting aberrations induced by the sample holder or the sample. As a result, a minimization of aberrations can also be set for planes in the sample which are situated deep down from the viewpoint of the detection objective. Furthermore, the control device controls the first slit stop in such a way that in the event of a displacement of the focal plane, the position of the opening of the first slit stop corresponds to that region of the focal plane which is intersected by the first light sheet, such that those regions of the sample volume which are illuminated by the first light sheet and lie outside the focal plane of the detection objective are masked out.

Furthermore, the control device can be connected to the illumination device, the sample carrier or both for the control thereof in order to change the position of the first light sheet plane relative to the object plane. By changing the position of the light sheet plane relative to the object plane and by sequentially imaging different regions of the sample volume, it is possible for large sample volumes to be captured completely. The individually recorded image representations of the different light sheet planes can be joined together to form a three-dimensional image representation after the imaging.

The illumination device having the illumination objective is advantageously designed for illuminating the sample with a second light sheet, which intersects the sample volume in a second light sheet plane. A second wavelength for generating the second light sheet can correspond to the first wavelength for generating the first light sheet. However, the second wavelength can also be different than the first wavelength. The light coming from the sample is preferably fluorescence light excited in the sample by the illumination with the first light sheet and the second light sheet, the wavelengths or wavelength ranges of said fluorescence light not encompassing the first wavelength of the first light sheet and the second wavelength of the second light sheet. The second light sheet plane intersects the object plane at a skew second illumination angle. If the sample is illuminated with a second light sheet, the area detector comprises a second slit stop arranged in the detection beam path upstream of the area detector in such a way as to mask out such regions of the sample volume which are illuminated by the second light sheet but lie outside the focal plane of the detection objective. Regions of the sample volume which are illuminated by the second light sheet and lie in the focal plane are imaged onto the area detector through an opening in the second slit stop.

Through the opening in the first slit stop and the opening in the second slit stop, different regions of the focal plane or different wavelength ranges of the light coming from the sample from a region of the focal plane are imaged on the area detector. By virtue of the first light sheet and the second light sheet, fluorescence light having different wavelengths or wavelength ranges can be excited in the sample in particular if the first wavelength is different than the second wavelength.

The first light sheet plane and the second light sheet plane can form an intersection angle with one another which is different than zero. The first light sheet plane and the second light sheet plane can form an intersection angle with one another which is 90°, for example.

If the detection device comprises an adaptive optical detection element, which is arranged in the detection beam path or is introducible into the latter and is controlled by a control device and by which the focal plane of the detection objective can be displaced in the sample volume and the sample is illuminated with the second light sheet, the second slit stop can likewise be arranged in the detection beam path in a displaceable fashion parallel to the detector plane in order to detect different regions of the focal plane. In this case, the control device likewise controls the second slit stop in such a way that in the event of a displacement of the focal plane, the position of the opening of the second slit stop corresponds to that region of the focal plane which is intersected by the second light sheet, such that those regions of the sample volume which are illuminated by the second light sheet and lie outside the focal plane of the detection objective are masked out.

Particularly preferably, the illumination objective and the detection objective are embodied as one of the same double objective. For coupling the illumination beam path and the detection beam path into the double objective, a dichroic mirror can be arranged in the detection beam path. For coupling the illumination beam path and the detection beam path into the double objective, alternatively a glass plate having a reflective coating, which is applied only in the regions of the glass plate on which the first light sheet and/or the second light sheet are/is incident, can be arranged in the detection beam path.

Advantageously, the light sheet microscope is embodied as an inverse microscope. The arrangement as an inverse microscope is advantageous in the microscopy of biological samples, in particular, since conventional sample carriers can be used in this case.

The detection device can comprise an image field rotator, which is arranged in the detection beam path or is introducible into the latter and by which the focal plane of the detection objective can be rotated in the sample volume. The image field rotator can be designed for example as an inverting prism or an Abbe-Konig prism or as a mirror arrangement, as illustrated in FIG. 6 of EP 2 681 533 B1.

The adaptive optical detection element can comprise an Alvarez manipulator, a deformable mirror, a spatial light modulator (SLM), a microelectromechanical system (MEMS), a micromirror array lens system (MALS), an adjustable or adaptive lens and/or an adaptive lens system having a plurality of lenses. For displacing the focal plane of the detection objective, a focal length of the adaptive optical element is preferably variable.

A first length of the first slit stop preferably corresponds to a first width of the first light sheet projected into the focal plane. A second length of the second slit stop preferably corresponds to a second width of the second light sheet projected into the focal plane. That has the advantage that all light coming from the sample from the region in which the first light sheet intersects the focal plane and from the region in which the second light sheet intersects the focal plane reaches the area detector, whereas stray light and light from other regions of the sample volume do not reach the area detector. Consequently, the largest possible region of the focal plane can be imaged, without the lateral resolution or the contrast deteriorating.

The second slit stop can be designed analogously to the first slit stop as a rolling shutter or as a mechanically displaceable slit stop.

The object is furthermore achieved by means of a method for light sheet microscopy. In the method, in a first step (a), a sample having a sample volume, said sample being arranged in an object plane on a sample carrier, is illuminated with a first light sheet, which intersects the sample volume in a first light sheet plane. As a result of the sample being illuminated with the first light sheet, preferably a first fluorescence is excited in the sample. The first light sheet plane forms a skew first illumination angle with the object plane. Afterward, a second step (b) involves setting a position of a focal plane of a detection objective in the sample volume. In this case, the focal plane of the detection objective lies parallel to or in the object plane in the sample volume. Subsequently, in a third step (c), a first slit stop arranged upstream of an area detector is displaced into a position at which the opening of the first slit stop corresponds to that region of the focal plane which is intersected by the first light sheet and those regions of the sample volume which are illuminated by the first light sheet and lie outside the focal plane of the detection objective are masked out. The fact that the opening of the first slit stop corresponds to that region of the focal plane which is intersected by the first light sheet means that the slit stop is positioned upstream of the detector such that only that region of the focal plane in which the light sheet intersects the focal plane is imaged. After the first slit stop has been displaced to the correct position, in a fourth step (d), light coming from the sample is imaged onto the area detector via the detection objective. Subsequently, in a fifth step (e), setting the position of the focal plane, displacing the first slit stop and imaging the light coming from the sample are repeated until a region of interest in the sample volume has been imaged completely. The region of interest, also called ROI, is that region of the sample volume which is intended to be imaged on the area detector. The region of interest can comprise only a part of the sample volume or the entire sample volume. In principle, steps (a) to (d) can also be performed simultaneously or in an interchanged order as long as the position of the first slit stop corresponds to the position of the focal plane during the imaging of the light coming from the sample.

During the illumination of the sample, the sample can additionally be illuminated with a second light sheet, which intersects the sample volume in a second light sheet plane. As a result of the sample being illuminated with the second light sheet, preferably a second fluorescence is excited in the sample. The second light sheet plane can form a skew second illumination angle with the object plane. If the sample is illuminated with the second light sheet, in addition to the first slit stop, a second slit stop arranged upstream of an area detector is displaced such that the opening of the second slit stop corresponds to that region of the focal plane which is intersected by the second light sheet and those regions of the sample volume which are illuminated by the second light sheet and lie outside the focal plane of the detection objective are masked out.

Following step (d), the position of the first light sheet plane relative to the object plane can be changed. If the sample is illuminated with the second light sheet, the position of the second light sheet plane relative to the object plane can be changed after the imaging of the light coming from the sample on the area detector. Preferably, whenever the position of the first light sheet plane and/or the second light sheet plane is changed, the entire region of the sample volume that is illuminated by the first light sheet and/or the second light sheet is imaged onto the area detector. How often the position of the first light sheet plane and/or the second light sheet plane relative to the object plane has to be changed until the entire sample volume has been imaged on the area detector is dependent on the sample volume of the sample. Following step (d), the focal plane of the detection objective can additionally be rotated in the sample volume.

In the method, a rolling shutter of the area detector can be used as the first slit stop and/or the second slit stop. In a rolling shutter individual lines of the area detector are exposed in a manner staggered over time. The rolling shutter has a defined width and moves over the area detector within an exposure time. During the exposure time, the area detector is sensitive only at the pixel row that is not covered by the rolling shutter.

It goes without saying that the features mentioned above and the features yet to be explained hereinafter can be used not only in the specified combinations but also in other combinations or on their own without departing from the scope of the present invention.

The invention will be explained in even greater detail below on the basis of exemplary embodiments with reference to the accompanying drawings, which likewise disclose features essential to the invention. These exemplary embodiments are only illustrative and should not be construed as restrictive. For example, a description of an exemplary embodiment having a multiplicity of elements or components should not be construed as meaning that all of these elements or components are necessary for implementation. Rather, other exemplary embodiments may also contain alternative elements and components, fewer elements or components, or additional elements or components. Elements or components of different exemplary embodiments can be combined with one another, unless indicated otherwise. Modifications and variations that are described for one of the exemplary embodiments can also be applicable to other exemplary embodiments. In order to avoid repetition, elements that are the same or correspond to one another in different figures are denoted by the same reference signs and are not explained repeatedly. In the figures:

DETAILED DESCRIPTION

Figure 1:
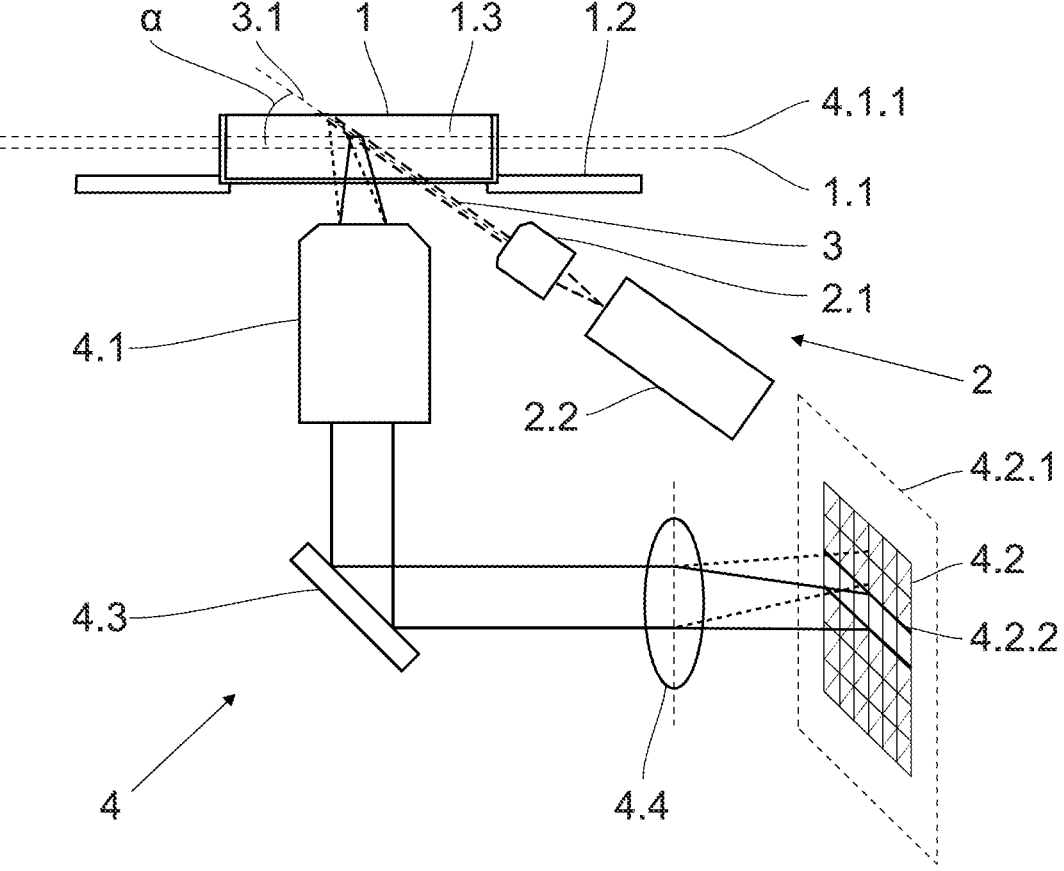
FIG. 1 shows a schematic side view of a first embodiment of a light sheet microscope having an illumination device having an illumination objective for illuminating a sample with a first light sheet, and having a detection device having a detection objective.

A first embodiment of a light sheet microscope for illuminating a sample 1 is illustrated in FIG. 1. The sample 1 is arranged in an object plane 1.1 on a sample carrier 1.2 and has a sample volume 1.3.

The light sheet microscope comprises an illumination device 2 having an illumination objective 2.1 for illuminating the sample 1 via an illumination beam path with a first light sheet 3, which intersects the sample volume 1.3 in a first light sheet plane 3.1. The first light sheet plane 3.1 intersects the object plane 1.1 at a skew first illumination angle $\alpha$. For this purpose, the illumination device 2 has a light source 2.2, which emits illumination light that is shaped into the first light sheet 3 by the illumination objective 2.1. By way of example, a laser light source can be used as the light source 2.2. In principle, however, incoherent light sources, for example customary lamps, in particular in the UV range, or LEDs, can also be used.

The light sheet microscope furthermore comprises a detection device 4 for the imaging of the light coming from the sample 1, having a detection objective 4.1 and an area detector 4.2. A focal plane 4.1.1 of the detection device 4 lies in the sample volume 1.3 parallel to the object plane 1.1. The area detector 4.2 has a detector plane 4.2.1, schematically illustrated as a matrix of a plurality of pixels of the area detector 4.2 in FIG. 1, and also a first slit stop 4.2.2.

A deflection mirror 4.3 is advantageously arranged between the detection objective 4.1 and the area detector 4.2, as in the first embodiment of the light sheet microscope. Deflecting the light coming from the sample 1 onto the area detector 4.2 enables the detection beam path to be made more compact.

For the imaging of the light coming from the sample 1, an imaging optical unit 4.4 can additionally be arranged between the detection objective 4.1 and the area detector 4.2. The beam paths of the light coming from the sample 1 are only schematically illustrated in FIG. 1, such that the light is refracted only at an optical axis of the imaging optical unit 4.4.

The area detector 4.2 can be designed for example as a CMOS chip, a PAD detector, a SPAD detector, or a CCD.

Regions of the sample volume 1.3 which do not correspond to the opening of the first slit stop 4.2.2 can be masked out by the first slit stop 4.2.2. In this case, the first slit stop 4.2.2 is arranged in such a way that such regions of the sample volume 1.3 which are illuminated by the first light sheet 3 but lie outside the focal plane 4.1.1 of the detection objective 4.1 are masked out and light from the regions of the sample volume 1.3 which, from the viewpoint of the detection objective 4.1, lie upstream and downstream of the regions which are illuminated by the first light sheet 3 and lie in the focal plane 4.1.1 reaches the area detector 4.2. As a result, less stray light and less light coming from the sample 1 from the regions which lie outside the focal plane 4.1.1 reach the area detector 4.2. Consequently, an imaging contrast and also a lateral resolution are improved by comparison with a light sheet microscope without a first slit stop 4.2.2.

FIG. 1 shows a beam path of the light coming from the sample 1, which beam path comes from the region in which the first light sheet 3 intersects the focal plane 4.1.1. The light from the region in which the first light sheet 3 intersects the focal plane 4.1.1 passes through an opening of the first slit stop 4.2.2 to the area detector 4.2 and is imaged onto the latter.

FIG. 1 furthermore shows a further beam path of the light coming from the sample 1, which further beam path comes from the region in which the first light sheet 3 intersects the sample volume 1.3 but lies outside the focal plane 4.1.1 of the detection objective 4.1. The further beam path is illustrated in a dashed manner. The light of the further beam path is masked out by the first slit stop 4.2.2. The regions masked out by the first slit stop 4.2.2 on the area detector 4.2 are illustrated in a hatched manner in FIG. 1 and in FIG. 2.

The first embodiment of the light sheet microscope is restricted to a static arrangement. Since the first slit stop 4.2.2 is not displaceable in the detection beam path, only a focal plane 4.1.1 of the detection objective 4.1 can be imaged sharply on the area detector 4.2. In order nevertheless to image the entire focal plane 4.1.1, the first light sheet 3 can be displaced along the focal plane 4.1.1.

Since the detection objective 4.1 has a finite depth of focus, a sharply imaged region extended along the optical axis of the detection objective 4.1 corresponds, in principle, to the focal plane 4.1.1. Since the intention is for as far as possible the entire numerical aperture of the detection objective 4.1 to be used during the imaging of the light coming from the sample 1 in order to achieve the best possible lateral resolution, the depth of focus of the detection objective 4.1 is generally small. Therefore, in the case of samples 1 having a comparatively large sample volume 1.3, many imagings in different focal planes 4.1.1 are necessary in order to image the entire region in which the first light sheet 3 intersects the sample volume 1.3.

Figure 2:
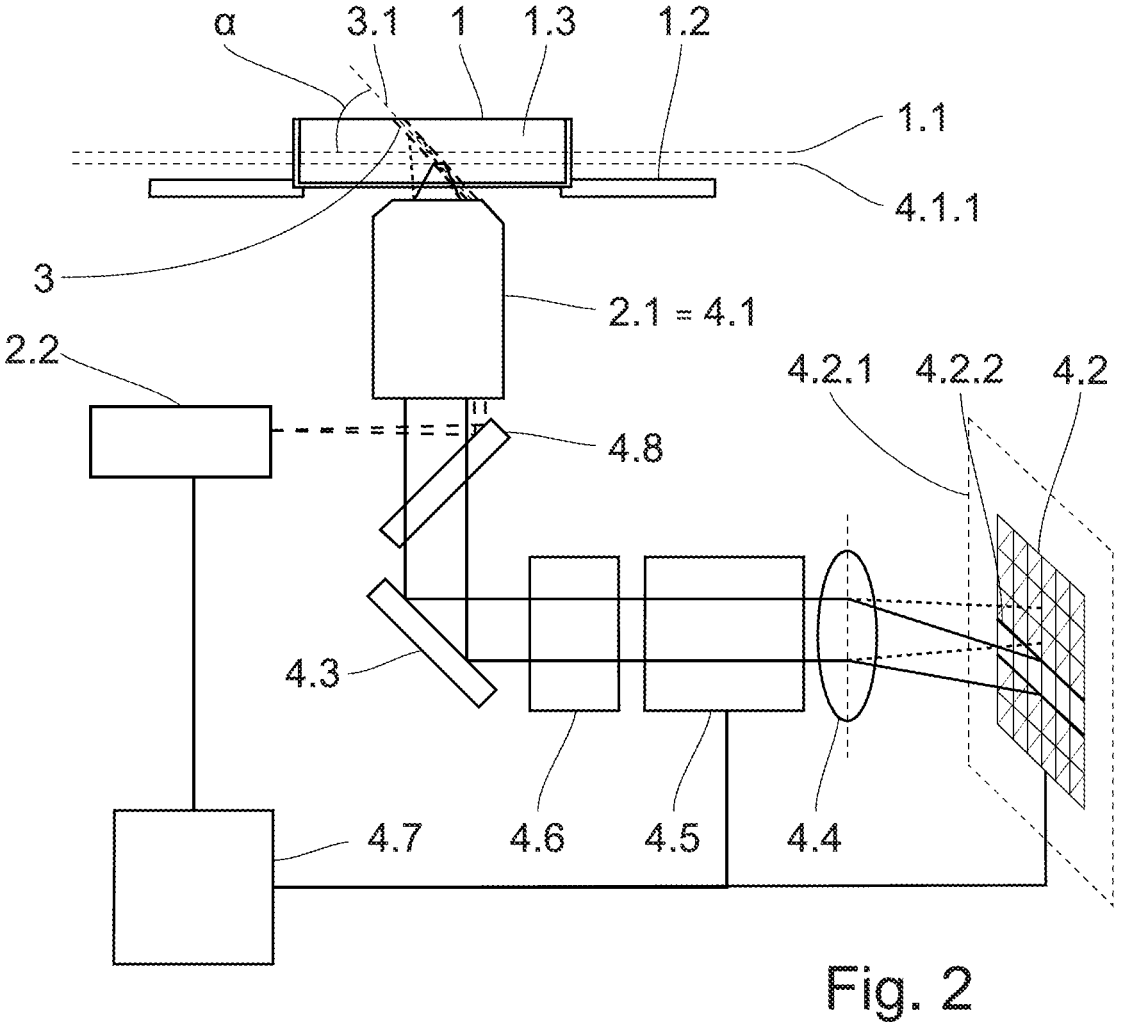
FIG. 2 shows a schematic side view of a second embodiment of the light sheet microscope having the illumination device for illuminating the sample with the first light sheet, and having the detection device having a common double objective for illumination and detection.

FIG. 2 shows a second embodiment of the light sheet microscope. The second embodiment of the light sheet microscope also comprises an illumination device 2 having an illumination objective 2.1 and a detection device 4 having a detection objective 4.1. In the second embodiment of the light sheet microscope, the illumination objective 2.1 and the detection objective 4.1 are one and the same double objective 6, i.e. illumination and detection are effected by a single double objective 6 and take different light paths in the double objective 6. In this case, the illumination beam path and the detection beam path can share some elements of the double objective 6.

The sample 1 is illuminated with the first light sheet 3 via the double objective 6. Here, too, the first light sheet plane 3.1 forms a first illumination angle α with the object plane 1.1. At the same time the light coming from the sample 1 is imaged on the area detector 4.2 by the double objective 6 or the detection objective 4.1.

In contrast to the configuration according to FIG. 1, the first slit stop 4.2.2 is arranged in the detection beam path in a displaceable fashion parallel to the detector plane 4.2.1 in order to detect different regions of the focal plane 4.1.1, and the detection device 4 comprises an adaptive optical detection element 4.5, which is arranged in the detection beam path or is introducible into the latter. The adaptive optical detection element 4.5 is connected to a control device 4.7 and is designed to displace or set the focal plane 4.1.1 of the detection objective 4.1 in the sample volume 1.3 perpendicular to the optical axis of the detection objective 4.1 or to the object plane 1.1. For this purpose, the adaptive optical detection element 4.5 is controlled by the control device 4.7. The adaptive optical element 4.5 advantageously comprises an Alvarez manipulator, a deformable mirror, a spatial light modulator, a microelectromechanical system (MEMS), a micromirror array lens system (MALS), an adjustable or adaptive lens and/or an adaptive lens system having a plurality of such lenses, as are commercially available from the providers Optotune AG, Phaseform GmbH or DYNAMIC OPTICS srl., inter alia. The focal plane 4.1.1 can be displaced for example by internal focusing by the adaptive optical element 4.5.

The first slit stop 4.2.2 can be designed as a mechanically displaceable slit or as a so-called rolling shutter. The first slit stop 4.2.2 can be mounted directly on the area detector 4.2 or be part of the area detector 4.2. Whereas in a global shutter the entire image area is exposed simultaneously, in a rolling shutter individual lines of the area detector 4.2 are exposed in a manner staggered over time.

FIG. 2 also illustrates two beam paths of the light coming from the sample 1, of which one beam path coming from the intersection region of first light sheet 3 and focal plane 4.1.1 is imaged on the area detector 4.2 through the opening of the first slit stop 4.2.2 and a further beam path, illustrated in a dashed manner, is masked out by the first slit stop 4.2.2.

The control device 4.7 is additionally connected to the first slit stop 4.2.2 and designed to control the first slit stop 4.2.2 in such a way that in the event of a displacement of the focal plane 4.1.1, the position of the first slit stop 4.2.2 corresponds to that region of the focal plane 4.1.1 which is intersected by the first light sheet 3. As a result of the control, the focal plane 4.1.1 is displaced along the first light sheet 3 perpendicularly to the object plane 1.1. As a result of the control of the first slit stop 4.2.2, the first slit stop 4.2.2 follows the focal plane 4.1.1 and is positioned analogously to the position of the focal plane 4.1.1 and of the light sheet 3.

The control device 4.7 is furthermore connected to the illumination device 2 or the light source 2.1 and designed to control the light source 2.1 in order to change the position of the first light sheet plane 3.1 relative to the object plane 1.1.

For the purpose of coupling the illumination beam path into the detection beam path, a dichroic mirror 4.8 is arranged in the detection beam path in the case of the second embodiment of the light sheet microscope. The light coming from the light source 2.2 is deflected to the illumination objective 2.1 by the dichroic mirror 4.8. At the same time, the light coming from the sample 1, which is emitted fluorescence light, for example, and which therefore has a different wavelength than a first wavelength of the first light sheet 3, is transmitted by the dichroic mirror 4.8. Alternatively, it is also possible to use a glass plate 4.9 instead of the dichroic mirror 4.8.

Moreover, an optional image field rotator 4.6 is arranged here in the detection beam path, and makes it possible to rotate the focal plane 4.1.1 of the detection objective 4.1 in the sample volume 1.3. The image field rotator can be designed for example as an inverting prism or an Abbe-Konig prism or as a mirror arrangement, as illustrated in FIG. 6 of EP 2 681 533 B1. If the image field rotator is designed as a mirror arrangement, then the mirror arrangement comprises an adjustable scanning mirror and a plurality of mirror groups. The scanning mirror can be rotated such that it faces one of the mirror groups and reflects incident light beams in the direction of one of the mirror groups. Each of the mirror groups rotates incident light beams by a different defined angle and reflects the light beams back to the scanning mirror, from where the light beams can be reflected again in an exit direction. The image field can thus be rotated by the path of the incident light beams being inverted, for example.

Figure 3A:
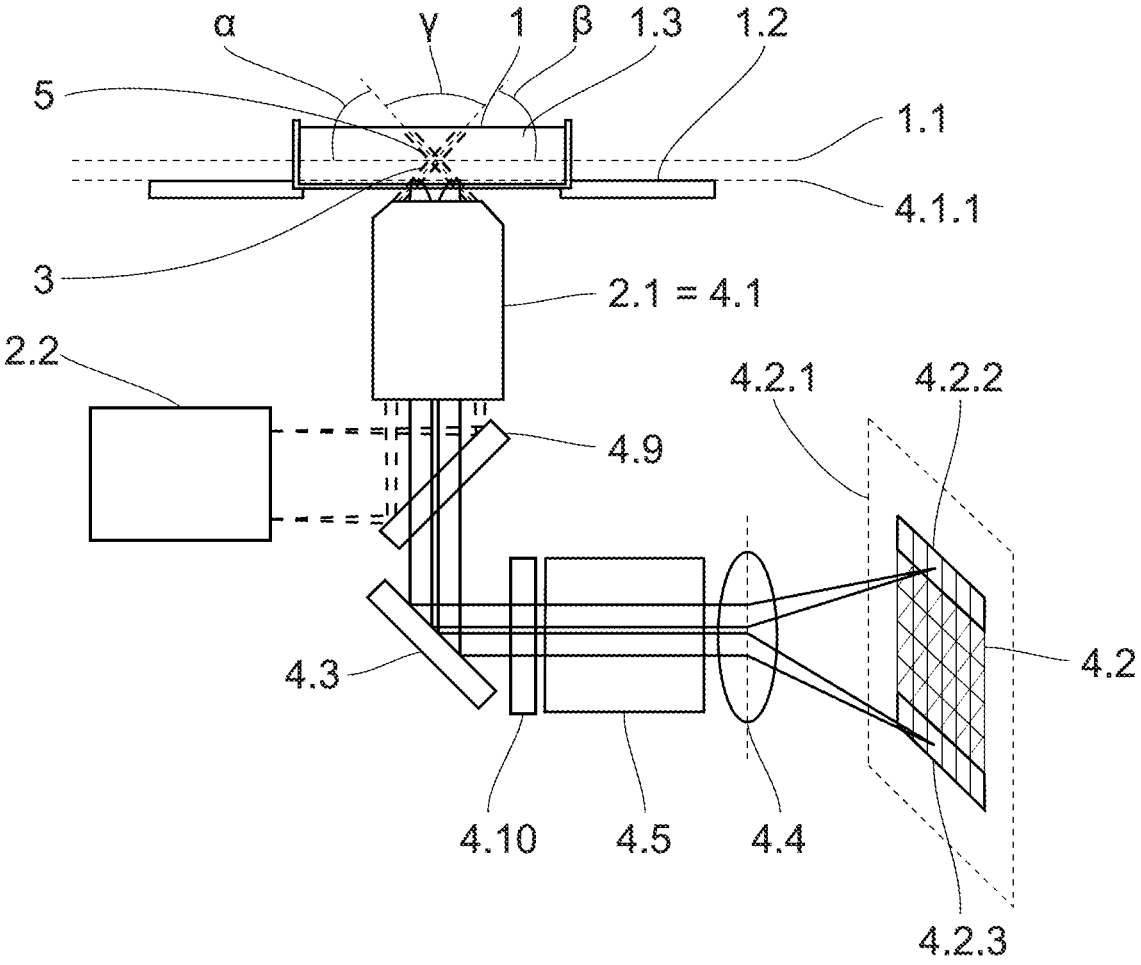
FIG. 3A shows a schematic side view of a third embodiment of the light sheet microscope having the illumination device for illuminating the sample with the first light sheet and a second light sheet, and having the detection device having the common double objective for illumination and detection, a focal plane of the double objective being positioned below an intersection region of the first light sheet and the second light sheet in the sample volume.
Figure 3B:
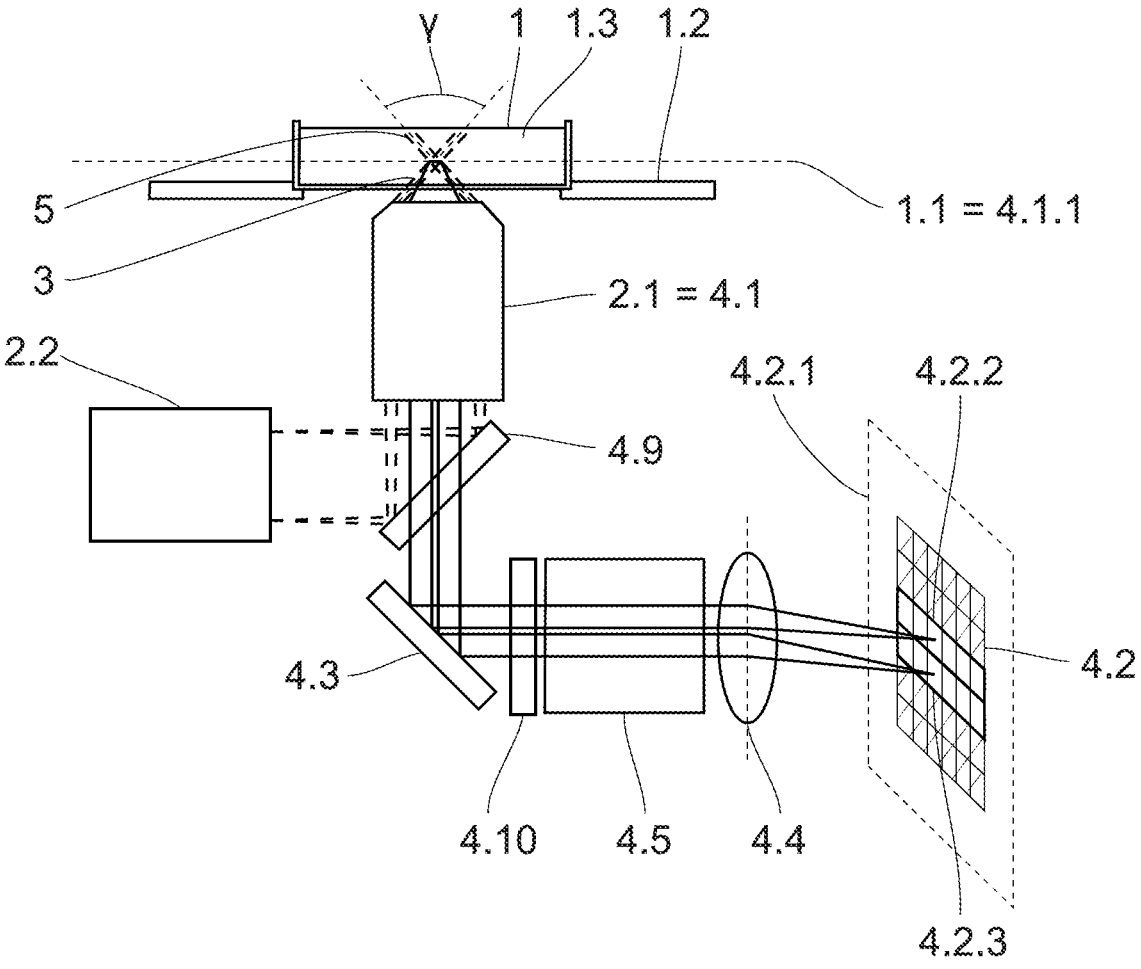
FIG. 3B shows a schematic side view of the third embodiment of the light sheet microscope having an illumination device for illuminating the sample with the first light sheet and the second light sheet, and having the detection device having a common double objective, the focal plane of the double objective being positioned in the intersection region of the first light sheet and the second light sheet in the sample volume.
Figure 3C:
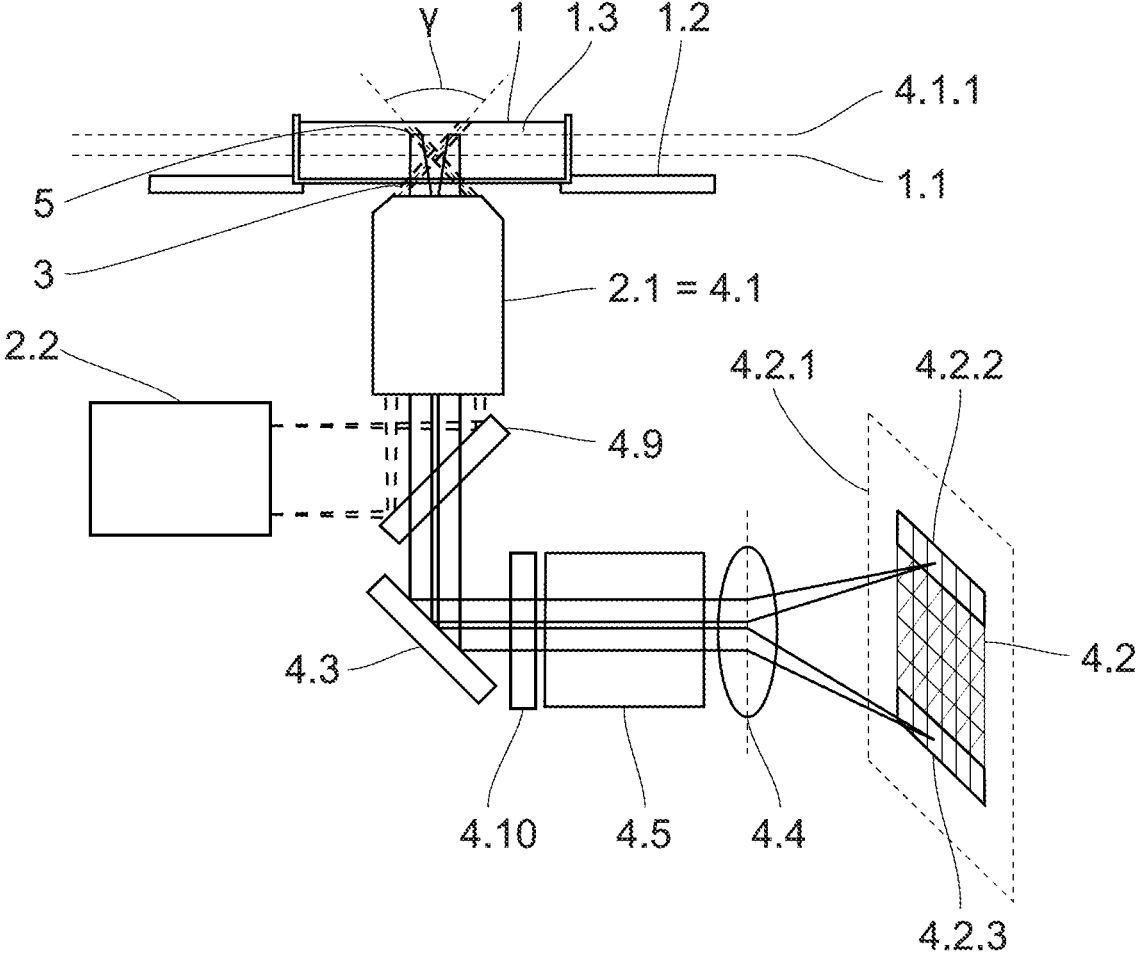
FIG. 3C shows a schematic side view of the third embodiment of the light sheet microscope having an illumination device for illuminating the sample with the first light sheet and the second light sheet, and having the detection device having a common double objective, the focal plane of the double objective being positioned above the intersection region of the first light sheet and the second light sheet in the sample volume.

A third embodiment of the light sheet microscope is illustrated in FIGS. 3A-3C. In the third embodiment of the light sheet microscope, the illumination device 2 having the illumination objective 2.1 is designed for illuminating the sample 1 with a second light sheet 5. The second light sheet 5 intersects the sample volume 1.3 in a second light sheet plane 5.1. The second light sheet plane 5.1 intersects the object plane 1.1 at a skew second illumination angle β. The first light sheet 3 and the second light sheet 5 intersect in the sample volume 1.3 at an intersection angle γ, thus giving rise to an intersection region of the first light sheet 3 and the second light sheet 5.

In the third embodiment, the area detector 4.2 comprises a second slit stop 4.2.3 arranged in the detection beam path upstream of the area detector 4.2 in such a way as to mask out such regions of the sample volume 1.3 which are illuminated by the second light sheet 5 but lie outside the focal plane 4.1.1 of the detection objective 4.1. The second slit stop 4.2.3 can be configured analogously to the first slit stop 4.2.2. The first slit stop 4.2.2 and the second slit stop 4.2.3 are arranged in the detection beam path in a displaceable fashion parallel to the detector plane 4.2.1. The regions masked out on the area detector 4.2 by the first slit stop 4.2.2 and the second slit stop 4.2.3 are illustrated in a hatched manner in FIGS. 3A-3C.

For the purpose of coupling the illumination beam path into the detection beam path, a glass plate 4.9 is arranged in the detection beam path in the case of the third embodiment of the light sheet microscope. The light coming from the light source 2.2 is deflected to the illumination objective 2.1 by the glass plate 4.9. At the same time, the light coming from the sample 1, which has a different wavelength than the first light sheet 3, is transmitted by the glass plate 4.9. In the regions on which the first light sheet 3 and/or the second light sheet 5 are/is incident, the glass plate 4.9 has a coating which is reflective in the range of the first wavelength of the first light sheet 3 and/or in the range of a second wavelength of the second light sheet 5. Alternatively, it is also possible to use a dichroic mirror 4.8 instead of the glass plate 4.9, as in the second exemplary embodiment.

Furthermore, a filter 4.10 is arranged in the detection beam path, and is designed to filter excitation light from the light coming from the sample 1, such that no excitation light reaches the area detector 4.2.

In FIG. 3A, the focal plane 4.1.1 of the detection objective 4.1 lies below the intersection region of the first light sheet 3 and the second light sheet 5 in the sample volume 1.3. The regions in which the first light sheet 3 and the second light sheet 5 intersect the focal plane 4.1.1 are imaged on the area detector 4.2. The regions to the left and right of the regions in which the first light sheet 3 and the second light sheet 5 intersect the focal plane 4.1.1 are masked out by the first slit stop 4.2.2 and the second slit stop 4.2.3.

In FIG. 3A, the first slit stop 4.2.2 and the second slit stop 4.2.3 are respectively situated at the outer edges of the area detector 4.2. They are displaced before, during or after the setting of the focal plane 4.1.1. If the focal plane 4.1.1 is displaced upward in the direction of the intersection region of the first light sheet 3 and the second light sheet 5, as in FIG. 3B, the first slit stop 4.2.2 and the second slit stop 4.2.3 are firstly displaced in the direction of the center of the area detector 4.2.

In FIG. 3B, the focal plane 4.1.1 of the detection objective 4.1 lies in the intersection region of the first light sheet 3 and the second light sheet 5. The first slit stop 4.2.2 and the second slit stop 4.2.3 are situated in the center of the area detector 4.2. If the focal plane 4.1.1 is displaced further upward, as in FIG. 3C, the first slit stop 4.2.2 and the second slit stop 4.2.3 are displaced in the direction of the edges of the area detector 4.2. If the first slit stop 4.2.2 and the second slit stop 4.2.3 are arranged at different distances from the area detector 4.2, they can be displaced past one another. If the first slit stop 4.2.2 and the second slit stop 4.2.3 are arranged at the same distance from the area detector 4.2, the first slit stop 4.2.2 and the second slit stop 4.2.3 can each be displaced only as far as the center of the area detector 4.2. If the focal plane 4.1.1 is positioned above the intersection region of the first light sheet 3 and the second light sheet 5, the region in which the second light sheet 5 intersects the focal plane 4.1.1 is imaged through the opening of the first slit stop 4.2.2. The region in which the first light sheet 3 intersects the focal plane 4.1.1 is then imaged through the opening of the second slit stop 4.2.3. The first slit stop 4.2.2 and the second slit stop 4.2.3 are subsequently displaced again into the positions shown in FIG. 3A. During the displacement of the first slit stop 4.2.2 and the second slit stop 4.2.3, at the same time the focal plane 4.1.1 is displaced and the regions in which the first light sheet 3 intersects the focal plane 4.1.1 are each imaged.

In FIG. 3C, the focal plane 4.1.1 of the detection objective 4.1 lies above the intersection region of the first light sheet 3 and the second light sheet 5. The first slit stop 4.2.2 and the second slit stop 4.2.3 are displaced again into the positions shown in FIG. 3A. The entire region in which the first light sheet 3 and the second light sheet 5 intersect the sample volume 1.3, or only a part of the region in which the first light sheet 3 and the second light sheet 5 intersect the sample volume 1.3, can be imaged on the area detector 4.2.

The light sheet microscope in accordance with the second and third embodiments can be used to carry out the method for light sheet microscopy. The second and third embodiments of the light sheet microscope can be operated dynamically. That means that the focal plane 4.1.1 can be set here and the first slit stop 4.2.2 can be displaced into a position corresponding to the focal plane 4.1.1. In this case, the sample 1 is firstly illuminated with the first light sheet 3, which intersects the sample volume 1.3 in the first light sheet plane 3.1. Afterward, the position of the focal plane 4.1.1 of the detection objective 4.1 in the sample volume 1.3 is set. In this case, the focal plane 4.1.1 of the detection objective 4.1 lies parallel to or in the object plane 1.1 in the sample volume 1.3. In addition, the first slit stop 4.2.2 arranged upstream of the area detector 4.2 is displaced into a position at which the opening of the first slit stop 4.2.2 corresponds to that region of the focal plane 4.1.1 which is intersected by the first light sheet 3. As a result, the regions of the sample volume 1.3 which are illuminated by the first light sheet 3 and lie outside the focal plane 4.1.1 of the detection objective 4.1 are masked out. Subsequently, the light coming from the sample 1 is imaged onto the area detector 4.2 via the detection objective 4.1. After the recording of an image by means of the imaging, the steps of setting the position of the focal plane 4.1.1, synchronously therewith displacing the first slit stop 4.2.2, and imaging the light coming from the sample 1 are repeated until a region of interest in the sample volume 1.3 has been imaged. The region of interest can comprise only a part of the sample volume 1.3 or the entire sample volume 1.3.

With the second and third embodiments of the light sheet microscope, the sample 1 can additionally be illuminated with the second light sheet 5, which intersects the sample volume 1.3 in the second light sheet plane 5.1. In this case, the second slit stop 4.2.3 additionally arranged upstream of an area detector 4.2 is displaced such that the opening of the second slit stop 4.2.3 corresponds to that region of the focal plane 4.1.1 which is intersected by the second light sheet 5 and those regions of the sample volume 1.3 which are illuminated by the second light sheet 5 and lie outside the focal plane 4.1.1 of the detection objective 4.1 are masked out.

The position of the first light sheet plane 3.1 and/or the second light sheet plane 5.1 relative to the object plane 1.1 can be changed after the imaging. By changing the position of the first light sheet plane 3.1 and/or the second light sheet plane 5.1, it is possible to image larger sample volumes 1.3 on the area detector 4.2. Preferably, whenever the position of the first light sheet plane 3.1 and/or the second light sheet plane 5.1 is changed, the entire region of the sample volume 1.3 that is illuminated by the first light sheet 3 and/or the second light sheet 5 is imaged on the area detector 4.2. How often the position of the first light sheet plane 3.1 and/or the second light sheet plane 5.1 relative to the object plane 1.1 has to be changed until the entire sample volume 1.3 has been imaged on the area detector 4.2 is dependent on the sample volume 1.3 of the sample 1.

After the imaging of the light coming from the sample 1, the focal plane 4.1.1 of the detection objective 4.1 can be rotated in the sample volume 1.3 by the image field rotator 4.6.

LIST OF REFERENCE SIGNS

1.2 Sample carrier
1.3 Sample volume
2 Illumination device
2.1 Illumination objective
2.2 Light source
3 First light sheet
3.1 First light sheet plane
4 Detection device
4.1 Detection objective
4.1.1 Focal plane
4.2 Area detector
4.2.1 Detector plane

4.2.2 First slit stop
4.2.3 Second slit stop
4.3 Deflection mirror
4.4 Imaging optical unit
4.5 Adaptive optical detection element
4.6 Image field rotator
4.7 Control device
4.8 Dichroic mirror
4.9 Glass plate
4.10 Filter
5 Second light sheet
5.1 Second light sheet plane
6 Double objective
$\alpha$ First illumination angle
$\beta$ second illumination angle
$\gamma$ Intersection angle

The invention claimed is:

1. A light sheet microscope for illuminating a sample having a sample volume, said sample being arranged in an object plane on a sample carrier, the light sheet microscope comprising:
   an illumination device having an illumination objective for illuminating the sample via an illumination beam path with a first light sheet, which intersects the sample volume in a first light sheet plane, the first light sheet plane intersecting the object plane at a skew first illumination angle ($\alpha$); and
   a detection device for the imaging of light coming from the sample, having a detection objective, the focal plane of which lies in the sample volume parallel to or in the object plane, and an area detector having a detector plane;
   wherein the area detector comprises a first slit stop arranged in the detection beam path upstream of the area detector in such a way as to mask out such regions of the sample volume which are illuminated by the first light sheet but lie outside the focal plane of the detection objective.

2. The light sheet microscope as claimed in claim 1, wherein:
   the first slit stop is arranged in the detection beam path in a displaceable fashion parallel to the detector plane in order to detect different regions of the focal plane;
   the detection device comprises an adaptive optical detection element, which is arranged in the detection beam path or is introducible into the latter and is controlled by a control device and by which the focal plane of the detection objective can be displaced in the sample volume; and
   the control device controls the first slit stop in such a way that in the event of a displacement of the focal plane, the position of the opening of the first slit stop corresponds to that region of the focal plane which is intersected by the first light sheet, such that those regions of the sample volume which are illuminated by the first light sheet and lie outside the focal plane of the detection objective are masked out.

3. The light sheet microscope as claimed in claim 2, wherein the adaptive optical detection element comprises an Alvarez manipulator, a deformable mirror, a spatial light modulator, a microelectromechanical system (MEMS), a micromirror array lens system (MALS), an adjustable or adaptive lens and/or an adaptive lens system.

4. The light sheet microscope as claimed in claim 1, wherein the control device is connected to the illumination device, the sample carrier or both for the control thereof in order to change the position of the first light sheet plane relative to the object plane.

5. The light sheet microscope as claimed in claim 1, wherein the illumination device having the illumination objective is designed for illuminating the sample with a second light sheet, which intersects the sample volume in a second light sheet plane, the second light sheet plane intersecting the object plane at a skew second illumination angle ($\beta$), and the area detector comprises a second slit stop arranged in the detection beam path upstream of the area detector in such a way as to mask out such regions of the sample volume which are illuminated by the second light sheet but lie outside the focal plane of the detection objective.

6. The light sheet microscope as claimed in claim 5, wherein the first light sheet plane and the second light sheet plane form an intersection angle ($\gamma$) with one another which is different than zero.

7. The light sheet microscope as claimed in claim 5, the detection device comprising an adaptive optical detection element, which is arranged in the detection beam path or is introducible into the detection beam path and is controlled by a control device and by which the focal plane of the detection objective can be displaced in the sample volume; wherein:

the second slit stop is arranged in the detection beam path in a displaceable fashion parallel to the detector plane in order to detect different regions of the focal plane, and the control device controls the second slit stop in such a way that in an event of a displacement of the focal plane, the position of the opening of the second slit stop corresponds to that region of the focal plane which is intersected by the second light sheet, such that those regions of the sample volume which are illuminated by the second light sheet and lie outside the focal plane of the detection objective are masked out.

8. The light sheet microscope as claimed in claim 5, wherein a second length of the second slit stop corresponds to a second width of the second light sheet projected into the focal plane.

9. The light sheet microscope as claimed in claim 1, wherein the illumination objective and the detection objective are one and the same double objective.

10. The light sheet microscope as claimed in claim 9, wherein a dichroic mirror or a glass plate having a reflective coating for coupling the illumination beam path and the detection beam path into the double objective is introduced into the illumination beam path.

11. The light sheet microscope as claimed in claim 1, wherein the light sheet microscope is embodied as an inverse microscope.

12. The light sheet microscope as claimed in claim 1, wherein the detection device comprises an image field rotator, which is arranged in the detection beam path or is introducible into the detection beam path and by which the focal plane of the detection objective can be rotated in the sample volume.

13. The light sheet microscope as claimed in claim 1, wherein a first length of the first slit stop corresponds to a first width of the first light sheet projected into the focal plane.

14. The light sheet microscope as claimed in claim 1, wherein the first slit stop and/or the second slit stop are/is a rolling shutter of the area detector.

15. A method for light sheet microscopy, comprising the following steps:

(a) illuminating a sample having a sample volume, said sample being arranged in an object plane on a sample carrier, with a first light sheet, which intersects the sample volume in a first light sheet plane, the first light sheet plane intersecting the object plane at a skew first illumination angle ($\alpha$);

(b) setting a position of a focal plane of a detection objective in the sample volume, the focal plane of the detection objective lying parallel to or in the object plane in the sample volume;

(c) displacing a first slit stop arranged upstream of an area detector into a position at which the opening of the first slit stop corresponds to that region of the focal plane which is intersected by the first light sheet and those regions of the sample volume which are illuminated by the first light sheet and lie outside the focal plane of the detection objective are masked out; and (d) imaging light coming from the sample onto the area detector via the detection objective; and repeating steps b) to d), the position of the focal plane being displaced perpendicularly to the object plane until a region of interest in the sample volume has been imaged.

16. The method as claimed in claim 15, wherein, in step a), the sample is additionally illuminated with a second light sheet, which intersects the sample volume in a second light sheet plane, the second light sheet plane forming a skew second illumination angle ($\beta$) with the object plane, and, in step c), a second slit stop arranged upstream of an area detector is additionally displaced such that the opening of the second slit stop corresponds to that region of the focal plane which is intersected by the second light sheet and those regions of the sample volume which are illuminated by the second light sheet and lie outside the focal plane of the detection objective are masked out.

17. The method as claimed in claim 16, wherein, in step d), the position of the second light sheet plane relative to the object plane is changed after the imaging.

18. The method as claimed in claim 15, wherein, in step d), the position of the first light sheet plane relative to the object plane is changed after the imaging.

19. The method as claimed in claim 15, wherein, in step d), the focal plane of the detection objective is rotated in the sample volume after the imaging.

20. The method as claimed in claim 15, wherein a rolling shutter of the area detector is used as the first slit stop and/or the second slit stop.

* * * * *